US009710792B2

(12) United States Patent
Bhamidipaty et al.

(10) Patent No.: US 9,710,792 B2
(45) Date of Patent: Jul. 18, 2017

(54) RETROSPECTIVE MANAGEMENT OF PREVIOUSLY SENT ELECTRONIC MESSAGES

(71) Applicant: International Business Machines Corporation, Armonk, NY (US)

(72) Inventors: Anuradha Bhamidipaty, Bangalore (IN); James Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 14/077,794

(22) Filed: Nov. 12, 2013

(65) Prior Publication Data

US 2015/0134749 A1    May 14, 2015

(51) Int. Cl.
*G06F 15/16* (2006.01)
*G06Q 10/10* (2012.01)

(52) U.S. Cl.
CPC ................. *G06Q 10/107* (2013.01)

(58) Field of Classification Search
CPC ....................................... H04L 29/08
USPC ........................................ 709/206
See application file for complete search history.

(56) References Cited

U.S. PATENT DOCUMENTS

| | | | |
|---|---|---|---|
| 6,424,997 B1 | 7/2002 | Buskirk, Jr. et al. | |
| 7,299,261 B1 | 11/2007 | Oliver et al. | |
| 8,132,250 B2 | 3/2012 | Judge et al. | |
| 8,135,710 B2* | 3/2012 | Summerlin et al. | 707/728 |
| 8,285,806 B2 | 10/2012 | Yu | |
| 2003/0236695 A1* | 12/2003 | Litwin, Jr. | 705/10 |
| 2007/0005762 A1* | 1/2007 | Knox | G06Q 10/107 709/224 |
| 2009/0171581 A1* | 7/2009 | Ushida et al. | 701/211 |
| 2010/0011071 A1 | 1/2010 | Zheleva | |
| 2012/0005282 A1* | 1/2012 | Steinbok et al. | 709/206 |
| 2012/0290662 A1* | 11/2012 | Weber et al. | 709/206 |
| 2014/0089092 A1* | 3/2014 | Kilmer et al. | 705/14.58 |
| 2014/0359480 A1* | 12/2014 | Vellal | H04L 51/16 715/752 |

OTHER PUBLICATIONS

Ozcaglar, Cagri, "Classification of Email Messages Into Topics Using Latent Dirichlet Allocation," A Thesis Submitted to the Graduate Faculty of Rensselaer Polytechnic Institute, Apr. 2008, 37 pages, Rensselaer Polytechnic Institute, Troy, New York, USA.

(Continued)

*Primary Examiner* — Vivek Srivastava
*Assistant Examiner* — Karina J Garcia-Ching
(74) *Attorney, Agent, or Firm* — Ference & Associates LLC

(57) ABSTRACT

Methods and arrangements for managing one or more electronic messages. An electronic message is obtained. A numerical metric is calculated corresponding to the message, the numerical metric comprising at least one of: a confidence level relating to whether the message has been addressed; and a topic-based distance from a reference. The message is altered, based on the numerical metric, and the altering comprises altering at least one of: an attribute associated with an appearance of the message and a position of the message. Other variants and embodiments are broadly contemplated herein.

18 Claims, 4 Drawing Sheets

(56) References Cited

OTHER PUBLICATIONS

Dredze et al, "Generating Summary Keywords for Emails Using Topics," Proceedings of the 13th International Conference on Intelligent User Interfaces, Maspalomas, Gran Canaria, Spain, Jan. 13-16, 2008, pp. 199-206, ACM Digital Library.
Blei, David M. et al, "Latent Dirichlet Allocation," Journal of Machine Learning Research, Jan. 2003, pp. 993-1022, vol. 3, Microtome Publishing, Brookline, MA, USA.

* cited by examiner

RETROSPECTIVE MANAGEMENT OF PREVIOUSLY SENT ELECTRONIC MESSAGES

BACKGROUND

Generally, a user of an email or instant-message system often receives requests and related messages that require a response or an action (e.g., requests to become a connection on a job networking site, bill payment reminders, etc.). Sometimes, such messages also come to be repeated, e.g., whether as reminders (generated automatically or by the sender), because of an error, because of more than one person sending the same or a similar message, or in view of dissemination to more than one device or system that a recipient might access.

A user might respond to a message or request using one or more devices, e.g., a desktop, laptop, tablet or smartphone, without even having read all of the pending alerts that sit in his or her inbox. Indeed, an alert may have actually been sent to two or more different devices. For example, a user may have accepted an invitation to become a connection on a job networking site, but there may still be unread emails sent on an assumption that a related request is still pending. Thus, even though in reality the request may have been acted upon, such unread emails might not actually require a user's attention. Because such clutter can potentially obscure or bury other messages or requests, it often becomes very difficult for a user to keep track of messages or requests that might actually prove to be important.

BRIEF SUMMARY

In summary, one aspect of the invention provides a method of managing one or more electronic messages, the method comprising: obtaining an electronic message; calculating a numerical metric corresponding to the message, the numerical metric comprising at least one of: a confidence level relating to whether the message has been addressed; and a topic-based distance from a reference; and altering the message, based on the numerical metric; the altering comprising altering at least one of: an attribute associated with an appearance of the message and a position of the message.

Another aspect of the invention provides an apparatus for managing one or more electronic messages, the apparatus comprising: at least one processor; and a computer readable storage medium having computer readable program code embodied therewith and executable by the at least one processor, the computer readable program code comprising: computer readable program code configured to obtain an electronic message; computer readable program code configured to calculate a numerical metric corresponding to the message, the numerical metric comprising at least one of: a confidence level relating to whether the message has been addressed; and a topic-based distance from a reference; and computer readable program code configured to alter the message, based on the numerical metric, via altering at least one of: an attribute associated with an appearance of the message and a position of the message.

An additional aspect of the invention provides a computer program product for managing one or more electronic messages comprising: a computer readable storage medium having computer readable program code embodied therewith, the computer readable program code comprising: computer readable program code configured to obtain an electronic message; computer readable program code configured to calculate a numerical metric corresponding to the message, the numerical metric comprising at least one of: a confidence level relating to whether the message has been addressed; and a topic-based distance from a reference; and computer readable program code configured to alter the message, based on the numerical metric, via altering at least one of: an attribute associated with an appearance of the message and a position of the message.

A further aspect of the invention provides a method for managing one or more electronic messages, said method comprising: obtaining an electronic message; computing a confidence level relating to whether the message has been addressed; migrating the message to a folder, based on the computed confidence level; the migrating comprising moving the message to a folder, wherein the folder corresponds to the computed confidence level.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
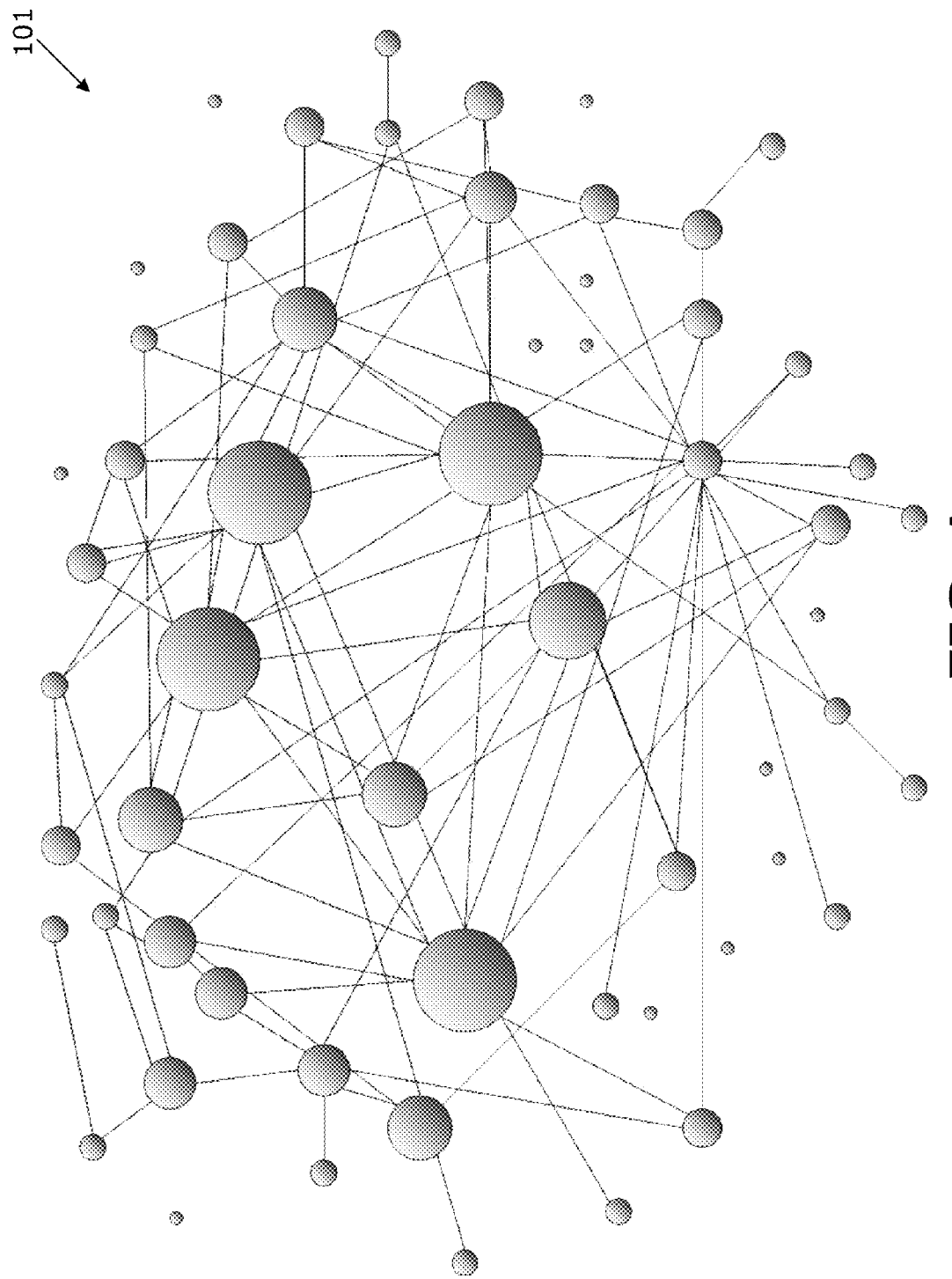
FIG. 1 illustrates an electronic mail graph, showing relationship-based links between email messages.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, is a system and method for retrospectively changing previously sent electronic messages such as email alerts, in a manner to facilitate easier management of such messages by a recipient. Such a system may be run as a trans-vendor service, tying in to different entities such as email hosts, job networking sites, social media sites and the like.

In accordance with at least one embodiment of the invention, a confidence level is computed relative to whether a message has been addressed or handled, thereupon migrating the message to one of several folders associated with different confidence levels. Inasmuch as users may often handle repeated alerts, messages, invitations and the like on different devices, such a mechanism to help manage email inflow can become particularly useful. For example, a user may have accepted a request to become a connection on a job networking site, wherein the request becomes visible on several devices of the user and may be repeated several times. It is thus possible that a user may not have opened or read many of these requests, despite already having acted upon the request. Accordingly, systems and methods as broadly contemplated herein can help automatically categorize such "acted-upon" requests and alerts.

In accordance with at least one embodiment of the invention, a mechanism is provided where acted-upon electronic messages and notifications are categorized and placed in folders that indicate to a user whether the messages need further action, with respect to a predetermined probability or confidence level. Similarly, it is also possible to use other marks and indicators for this purpose. For example, if request to become a connection on a job networking site is accepted by a user, the system may automatically move one or more corresponding notifications to a folder (e.g., a folder in an email application, or even to another folder), whether or not one or more corresponding messages have been opened or examined.

In accordance with at least one embodiment of the invention, it is recognized that a system may not be able to determine with full accuracy (or 100% confidence) the status of an electronic message. For example, if a user has responded to an email sender about a given topic (e.g., an email sent twice from Bob with, "Can we have lunch at noon?"), the system may determine via natural-language processing that, with a confidence level C, the associated request has been handled, and then move the original email into a folder encompassing that confidence level (e.g., a determined confidence level of 80% can correspond to a folder which encompasses a range such as "75 to 90%").

Accordingly, in accordance with at least one embodiment of the invention, a folder may indicate, along with a determined confidence level C (or range of confidence levels), that a message has been "handled." The confidence level (or range thereof) represented by a folder may be indicated, for example, through folder coloration or through various icons or symbols used for the folder. Additionally, the system may act to increase a confidence level C by analyzing direct indicators of response. This may be undertaken, e.g., simply by tracking "replying to" and "forwarding of" mails or other messages. On the other hand, if a request has been handled on one device, such as accepting a request to become a connection on a job networking site, then this can translate to a very high confidence that the request has been handled; accordingly, the determined confidence level may then be very high with respect to any devices and/or email clients in which the request (or a reminder thereof) continues to reside.

In accordance with at least one embodiment of the invention, a confidence level C may also be determined by a manual indication by the recipient, the original sender or one or more other individuals that something has been properly handled or, alternatively, that something has not yet been properly handled. (For instance, if approval for user access needs to be provided, there may also be a process to override such approval on the part of a higher authority. When such an authority performs the needed action, a manual indication can be made to a lower-level authority that further action regarding approval is not needed.) Additionally, the system may learn such indications through patterns of use by a user, thereby automatically inferring if something has been properly handled. For example, consider an email notification sent to the user about pending electricity bill payment. When such a bill is paid through on online transaction, even by a third party, the bank may send an alert to the user (at his/her mobile device) about the payment. Thus, via a suitable arrangement such as natural language processing, the system can relate the two messages (email and alert) and infer that the messages have been acted on and move them to the appropriate folder.

Although a system as broadly contemplated herein, in accordance with at least one embodiment of the invention, can be useful for determining alerts, reminders, and mails that have been acted upon, it can be similarly used to indicate alerts, reminders, messages, and mails that have not been acted upon and need to be acted upon; these, also, can have a determined confidence level appended that will guide their direction into a corresponding folder (defined by a confidence level or range thereof).

In accordance with at least one embodiment of the invention, by way of an illustrative and non-restrictive working example, a system may receive an indication that a message has been responded to (e.g., that a request has been handled for a user to become a connection at a job networking site). The system computes and then broadcasts a confidence level relating to whether the message has been addressed or handled. Based on the confidence level now calculated, the message is migrated to one of several folders associated with confidence levels (or ranges thereof).

In accordance with at least one variant embodiment of the invention, any of several additional components may be used. A user interface (UI) into an email account may be employed to facilitate user-guided displaying or storage of emails. A text analytics facility in the email software can include a capacity for Latent Dirichlet Allocation analysis (LDA). (For background purposes, a general discussion of LDA can be found in Blei, David M. et all, "Latent Dirichet Allocation", The Journal of Machine Learning Research, 3, pp. 993-1022, 2003.) Generally, LDA encompasses a learning algorithm for automatically and jointly clustering words into "topics" and documents into mixtures of topics.) A graph analytic (GA) facility in the email software, can relate emails (and/or alerts and reminders) to one another by their LDA scores and then represent these relationships as links in a graph, as shown in FIG. 1. Here, each circle represents a notification, and the edges (or interconnecting lines) represent linkages between the notifications. A graph partitioning component (GP) can also be included that automatically partitions the LDA email (and/or alert) graph and applies to email representations (e.g., circles/globes) a color or other distinctive marking such as shading or sizing, according to their proximity to various partition centers. (By way of clarification, a graph can be partitioned into smaller components which satisfy given properties such as a minimum number of edges shared between components. The centroid of such a partition, which presents maximum connectivity within the component, is the partition center.)

Figure 2:
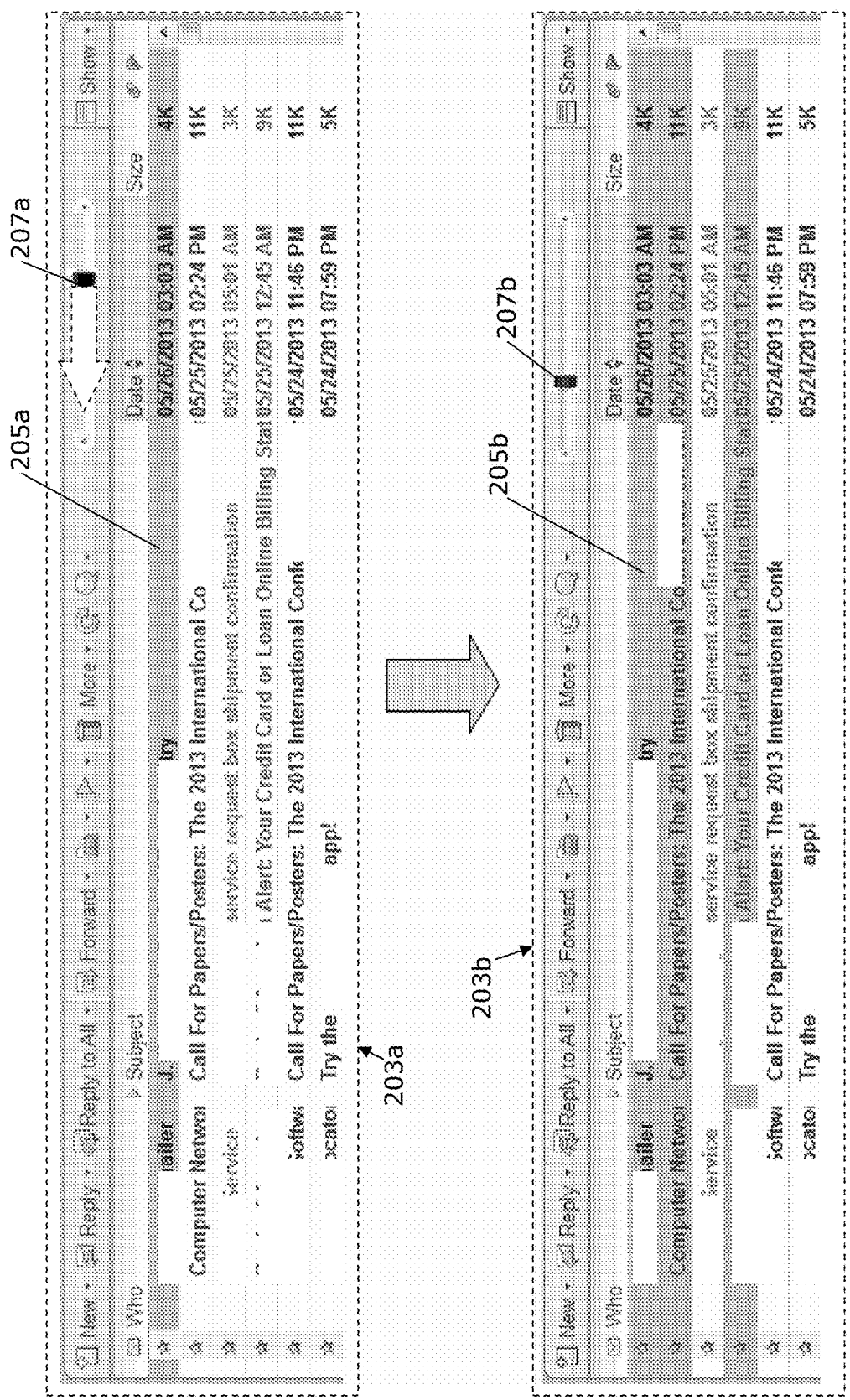
FIG. 2 illustrates screenshots of a user interface, depicting a capacity for a user to select multiple related emails and take action upon them.

In accordance with at least one embodiment of the invention, FIG. 2 illustrates screenshots of a UI, depicting a capacity for a user to select multiple related emails and take action upon them. In a first state of an email inbox (203a), most emails are not shaded (or colored), but one (205a) is shaded (or colored) as being selected by the user. Here, a user will determine which other emails, besides the shaded/colored one 205a, lie within a given threshold distance relative to an LDA email graph such as that shown in FIG. 1.

Accordingly, in accordance with at least one embodiment of the invention, an interactive slider component 205a is provided that can be slid horizontally (e.g., via cursor/clicking action by the user). In the present example, the user slides the slider 207a towards the left (as shown by the dotted arrow), and the result is a second state of the email inbox (203b), with the slider (207b) now moved to a position further left. The relative sliding distance is correlated with a threshold distance relative to an LDA email graph and, as such, additional emails beyond the initially selected one (205b) become shaded. To the extent that the effect of this action by a user is to designate one or more emails based on an LDA-based threshold distance, a further step can involve the one or more emails so designated being moved to one or more other folders; the one or more other folders can be defined by an LDA-based threshold distance. (By way of possible implementations, if the slider moves and some emails come to be shaded or colored, they could be immediately moved to the one or more other folders, or such action could be "confirmed" by a user-interactive button once the user decides that the step of sliding/selecting is finished.) It should be noted that emails such as 205a/b and others can be marked or made visually distinct in essentially any suitable manner; thus, while shading or coloring can provide such distinction, other graphical attributes can be altered such as font size, font color, font characteristics (e.g., bold or italics). Other distinguishing measures can be taken additionally or alternatively, such as affecting the color, shading or other graphical attributes of just one or more portions of an email (e.g., sender name, subject line), appending predetermined icons or symbols to emails, altering graphical characteristics of folders that contain emails, etc.

In accordance with at least one embodiment of the invention, variable coloring, shading or other visual alteration may be employed to convey different categories relative to a quantitative metric such as confidence level or LDA-based distance. Thus, for example, different colors or degrees of shading or brightness could convey ranges of LDA-based distances of given emails with respect to a reference (initially selected) email, or could convey ranges of confidence levels as discussed heretofore.

In accordance with at least one embodiment of the invention, the user can employ the slider 207a/b to select one or more emails on the basis of predetermined quantitative criteria (e.g., LDA-based distance from a reference email, or confidence level) and then take action on the one or more emails at once, such as moving them to a folder, marking them read, or deleting them. An analogous function can involve the system itself automatically selecting multiple related emails and take an action upon all of them, such as moving them to a folder, when the relationship is above a threshold.

Broadly contemplated herein, in accordance with at least one embodiment of the invention is a method of dragging one entire folder defined by given quantitative criteria, such as a range of confidence levels, to another folder; this may thus generate a composite folder whose characteristics (including visual characteristics) are based on a function of the two confidence levels. Thus, two different confidence levels that have a color or degree of shading associated with them can yield to a new color or degree of shading when two folders (defined by ranges of confidence levels) are combined. For example, a Confidence=90% folder defined by green may be dragged to join a folder with Confidence=50% defined by yellow, thereby yielding a single folder with a new color that may be a blend of green and yellow.

In accordance with at least one embodiment of the invention, message persistence in a folder, or the length of time messages might be saved until they expire, could be tied to confidence level. For example, if C=99% that a message or mail has been handled, the messages may be migrated to a folder whose contents are deleted or archived after 7 days. If C=40%, the messages may be migrated to a folder whose contents are deleted or archived after 90 days.

In accordance with at least one embodiment of the invention, various migrations of messages may also be represented as migration to containers (e.g., 3-D objects) in a virtual world. This may be also of use in 3-D games in which players receive alerts, messages, reminders, and the like. In such scenarios involving virtual worlds, the container properties, representations, and positions may be affected by confidence level C.

When messages are system-generated notifications, in accordance with at least one embodiment of the invention, the user can optionally link the message to a corresponding application on which an action needs to be taken. Thereafter, messages in a folder with low confidence (say, C<40%) can be displayed as a popup when the user next accesses the application prompting confirmation whether they have been acted upon. For example, notifications about password expiration in an Intranet (an organization's internal network) can be linked to the Intranet application (and specific URL). When the user is browsing the Intranet and visits the specific URL (or a URL that is "close" or related to it), the system can prompt the action related to the password expiration notification. The system may record the manual indication and learns from the input.

As an example explanation of a "close" URL, in accordance with at least one embodiment of the invention consider a user who receives notifications to approve yearly-evaluation goals of employees. These notices are tagged to the yearly-evaluation application at the URL. Next, when a user browses to a related URL, e.g., a company URL that is part of or is not far afield from human resources, the system may prompt the user to check if the user had acted on the notifications.

In accordance with at least one embodiment of the invention, various closely related embodiments are possible in which a system automatically updates delivered electronic notifications, with the update being triggered by an action performed on an application that sent the notification and nature of the update depending on the type of application and/or user customization. Here, the application sends notifications to prompt user action. The system determines whether actions related to the notifications are performed. The system automatically updates the notifications sent earlier (e.g., moves them to a special folder, marks them read, or deletes them) accordingly.

By way of an additional scenario in accordance with at least one embodiment of the invention, electronic notifications (email, SMS) are recognized as a common medium for alerting users and prompting action (e.g., notifications to accept new connection requests, bill payments, approvals etc.). Different ways to access the service provider (web, mobile applications etc.) make it convenient for users to act on these notifications. However, as with email applications discussed herein, there is a good chance that actions are taken but notifications are not updated in retrospect, leaving users to manually sort matters out.

For instance, by way of a working example in accordance with at least one embodiment of the invention, a job networking site may send notifications for connection requests via email. A user may then access a corresponding smartphone application and, irrespective of having read any notices, accepts all requests. The user checks his or inbox to find unread emails about pending requests which are probably already acted upon, but since he or she is not sure then he or she will need to manually sift through the notices.

Thus, in accordance with at least one embodiment of the invention, it is desirable to provide a mechanism which updates delivered notifications by moving them to special folders or marks them with recent status, thus indicating to the user if the notification needs to be further acted upon. For example, if a connection request (e.g., for a job networking site) is accepted, it can be moved it to a folder and marked as "read", even if in actuality it was never read.

Generally, and in brief recapitulation, in accordance with at least one embodiment of the invention, it can be appreciated that a numerical metric is calculated corresponding to a message, where the message is then altered based on the numerical metric. Such altering can involve altering an attribute associated with an appearance of the message (e.g., color, font or shading, or essentially any attribute that could be visually distinguishing when viewed by a user) and/or a position of the message. Such an altering of "position", as broadly contemplated herein, can involve (among other things) migrating the message to another folder or changing the position of the message with respect to at least one other message in another manner, e.g., via moving the message to a different position within a single display list of messages and/or a single folder. Additionally, position changes may involve migrating the message, or message indicator, to or from a virtual world, to or from various client devices (e.g., smart phones, tablet computers, etc.), to different displays in a multi-display system, or may involve movement among different email systems Here, the term "indicator" may refer to (among other things) any of: a message header; a message subject line; and/or one or more display lines for emails in an email client, wherein the one or more display lines contain such attributes as a sender name and/or a mail subject.

Figure 3:
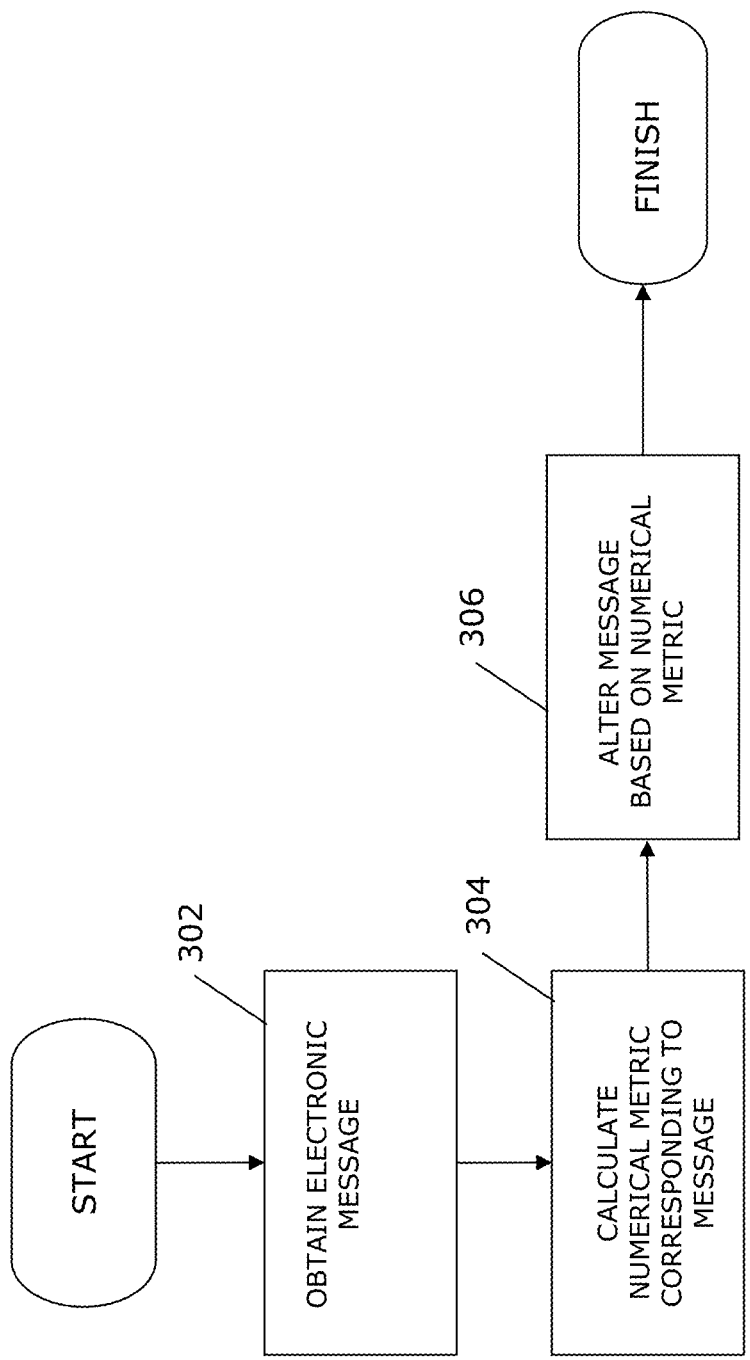
FIG. 3 sets forth a process more generally for managing one or more electronic messages.

FIG. 3 sets forth a process more generally for managing one or more electronic messages, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, an electronic message is obtained (302). A numerical metric is calculated corresponding to the message (304), the numerical metric comprising at least one of: a confidence level relating to whether the message has been addressed; and a topic-based distance from a reference. The message is altered, based on the numerical metric, via altering at least one of: an attribute associated with an appearance of the message and a position of the message (306).

Figure 4:
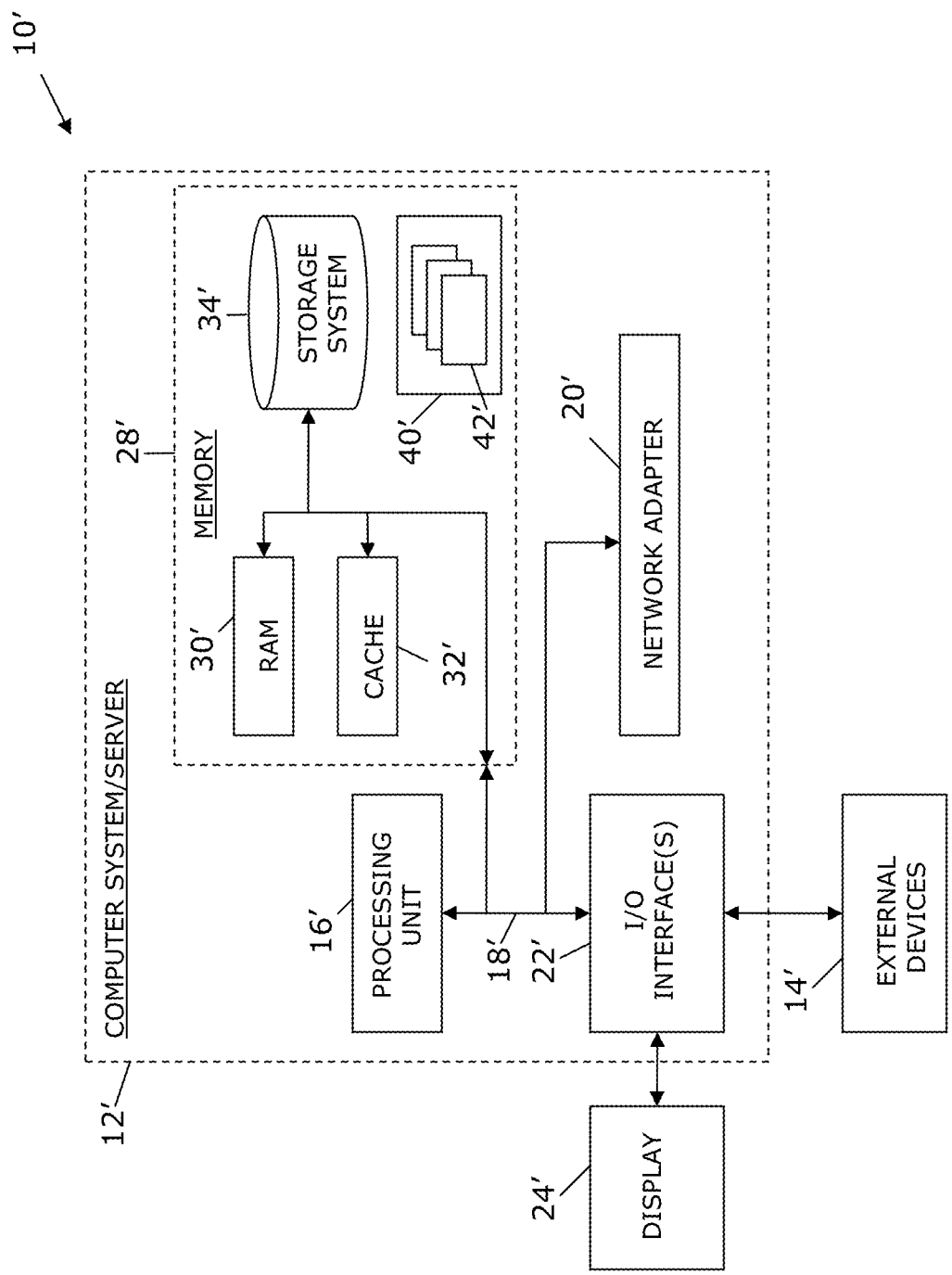
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of managing one or more electronic messages, said method comprising:
    obtaining a plurality of electronic messages, wherein more than one of the electronic messages is accessible from more than one device, wherein one of the plurality of electronic messages comprises a reference electronic message having a status that has been modified by a user;
    identifying, using a natural language processing technique, at least one topic in each of the plurality of electronic messages;
    clustering, based upon the at least one topic identified, the plurality of electronic messages;
    identifying, based upon the clusters, relationships between the plurality of electronic messages and generating links between electronic messages having a relationship;
    identifying a topic-based relationship between an obtained electronic message and the reference electronic message, wherein identifying the topic-based relationship comprises identifying, using the identified relationships between the plurality of electronic messages, a topic-based distance of the obtained electronic message from the reference electronic message, wherein the topic-based distance identifies a number of links between the obtained electronic message and the reference electronic message, and wherein the topic-based distance is identified based upon a topic analysis score of the obtained electronic message as compared to a topic analysis score of the reference electronic message;
    calculating a confidence level to be associated with the topic-based relationship based upon the number of links between the obtained electronic message and the reference electronic message; and
    altering the obtained electronic message, based on the topic-based relationship between the obtained electronic message and the reference electronic message and the confidence level associated with the topic-based relationship and the status of the reference electronic message having been modified;
    said altering comprising altering at least one of: an attribute associated with an appearance of the electronic message and a position of the electronic message.

2. The method according to claim 1, wherein said altering comprises altering the obtained electronic message relative to another message.

3. The method according to claim 1, wherein said altering comprises migrating the obtained electronic message to a folder, wherein the folder corresponds to the calculated confidence level of the obtained electronic message.

4. The method according to claim 3, wherein at least one appearance-based characteristic of the folder indicates the calculated confidence level.

5. The method according to claim 4, comprising generating a composite folder via combining the folder with another folder.

6. The method according to claim 5, wherein at least one characteristic of the composite folder is based on a function of the confidence levels of the two folders.

7. The method according to claim 1, wherein the confidence level is calculated via at least one of: natural-language processing, analysis of a reply to the reference electronic message, analysis of forwarding of the reference electronic message, at least one social network relationship determined with respect to the reference electronic message, a manual indication from a message recipient related to handling of the reference electronic message, a manual indication from a sender of the electronic message related to handling of the reference electronic message, an indication from at least one individual other than a sender or recipient of the reference electronic message related to handling of the reference electronic message, and an automatic determination related to handling of the reference electronic message.

8. The method according to claim 1, wherein the obtained electronic message remains in at least one folder until a predetermined expiration time, the expiration time being based on the confidence level.

9. The method according to claim 1, wherein said altering comprises associating the obtained electronic message with an application and, based on the confidence level, comprising prompting a user for input when the user accesses the application.

10. The method according to claim 1, wherein the topic-based distance comprises a distance identified using topic analysis scores derived from Latent Dirichlet Allocation analysis.

11. The method according to claim 1, wherein the reference electronic message comprises a pre-selected reference electronic message.

12. The method according to claim 1, wherein said altering comprises automatically migrating the obtained electronic message to a folder when the topic-based distance is above a predetermined threshold.

13. The method according to claim 1, comprising providing a user interface for assisting in the management of electronic messages.

14. The method according to claim 13, wherein said providing comprises providing a user-alterable regulator which sets a threshold related to the at least one numerical metric.

15. The method according to claim 1, wherein said altering comprises moving the obtained electronic message to a container in a virtual world.

16. An apparatus for managing one or more electronic messages, said apparatus comprising:
at least one processor; and
a non-transitory computer readable storage medium having computer readable program code embodied therewith and executable by the at least one processor, the computer readable program code comprising:
computer readable program code configured to obtain a plurality of electronic messages, wherein more than one of the electronic messages is accessible from more than one device, wherein one of the plurality of electronic messages comprise a reference electronic message having a status that has been modified by a user;
computer readable program code that identifies, using a natural language processing technique, at least one topic in each of the plurality of electronic messages;
computer readable program code that clusters, based upon the at least one topic identified, the plurality of electronic messages;
computer readable program code that identifies, based upon the clusters, relationships between the plurality of electronic messages and generates links between electronic messages having a relationship;
computer readable program code that identifies a topic-based relationship between a obtained electronic message and the reference electronic message, wherein identifying the topic-based relationship comprises identifying, using the identified relationships between the plurality of messages, a topic-based distance of the obtained electronic message from the reference electronic message, wherein the topic-based distance identifies a number of links between the obtained electronic message and the reference electronic message, and wherein the topic-based distance is identified based upon a topic analysis score of the obtained electronic message as compared to a topic analysis score of the reference electronic message;
computer readable program code that calculates a confidence level to be associated with the topic-based relationship based upon the number of links between the obtained electronic message and the reference electronic; and
computer readable program code configured to alter the obtained electronic message, based on the topic-based relationship between the obtained electronic message and the reference electronic message and the confidence level associated with the topic-based relationship and the status of the reference electronic message having been modified via altering at least one of: an attribute associated with an appearance of the electronic message and a position of the electronic message.

17. A computer program product for managing one or more electronic messages comprising:
a non-transitory computer readable storage medium having computer readable program code embodied therewith, the computer readable program code comprising:
computer readable program code configured to obtain an electronic message, wherein the electronic message is accessible from more than one device;
computer readable program code that identifies, using a natural language processing technique, at least one topic in each of the plurality of electronic messages;
computer readable program code that clusters, based upon the at least one topic identified, the plurality of electronic messages;
computer readable program code that identifies, based upon the clusters, relationships between the plurality of electronic messages and generates links between electronic messages having a relationship;
computer readable program code that identifies a topic-based relationship between a obtained electronic message and the reference electronic message, wherein identifying the topic-based relationship comprises identifying, using the identified relationships between the plurality of messages, a topic-based distance of the obtained electronic message from the reference electronic message, wherein the topic-based distance identifies a number of links between the obtained electronic message and the reference electronic message, and wherein the topic-based distance is identified based upon a topic analysis score of the obtained electronic message as compared to a topic analysis score of the reference electronic message;
computer readable program code that calculates a confidence level to be associated with the topic-based relationship based upon the number of links between the obtained electronic message and the reference electronic message; and
computer readable program code configured to alter the obtained electronic message, based on the topic-based relationship similarity between the obtained electronic message and the reference electronic message and the confidence level associated with the topic-based relationship and the status of the reference electronic having been modified via altering at least one of: an attribute associated with an appearance of the electronic message and a position of the electronic message.

18. A method for managing one or more electronic messages, said method comprising:

obtaining a plurality of electronic messages, wherein more than one of the electronic messages is accessible from more than one device;

computing a topic-based distance of a obtained electronic message of the plurality of electronic messages from a reference electronic message of the plurality of electronic message, wherein the reference electronic message comprises an indication of an action performed by a user, wherein the topic-based distance identifies a topic-based relationship of the obtained electronic message to the reference electronic message, wherein the topic-based relationship is identified based upon a number of links, and identified using a natural language processing clustering technique, identifying a relationship between at least one topic in the reference electronic message and at least one topic in the obtained electronic message, and wherein the topic-based distance is identified based upon a topic analysis score of the obtained electronic message as compared to a topic analysis score of the reference electronic message;

computing a confidence level for the topic-based distance computation based upon the number of links between the obtained electronic message and the reference electronic message; and moving the obtained electronic message to a folder, based on the topic-based distance between the obtained electronic message and the reference electronic message, confidence level, and the indication of the action performed by the user.

* * * * *